Nov. 22, 1955 J. H. MacPHEE 2,724,449
TANDEM AXLE SET WITH RETRACTABLE DRIVEN REAR AXLE
Filed May 1, 1952 3 Sheets-Sheet 1

INVENTOR
John H. MacPhee
Ralph Burch
Attorney

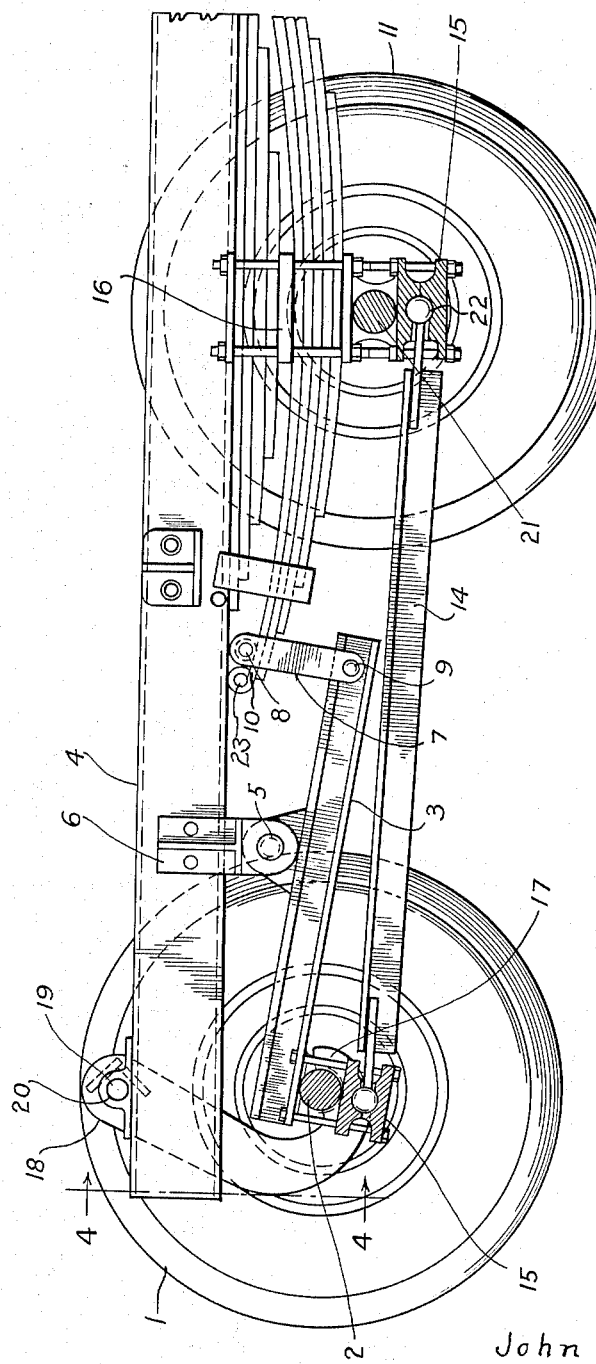

Nov. 22, 1955    J. H. MacPHEE    2,724,449
TANDEM AXLE SET WITH RETRACTABLE DRIVEN REAR AXLE
Filed May 1, 1952    3 Sheets-Sheet 3
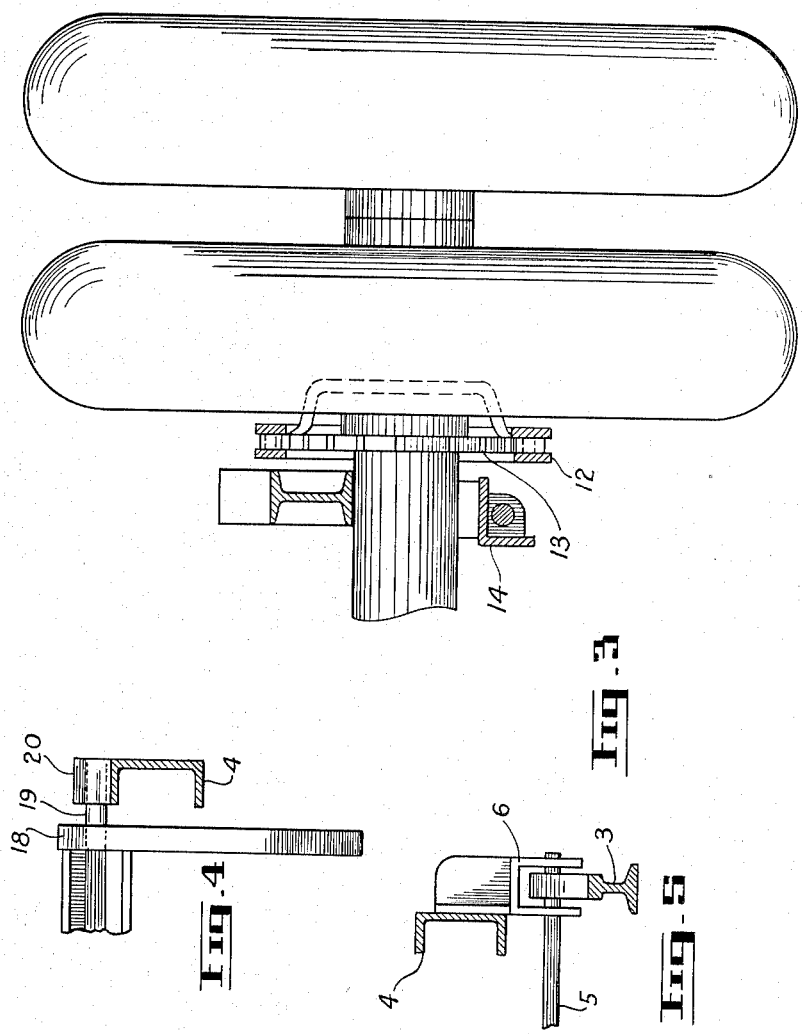
INVENTOR
John H. MacPhee
Ralph Burch

United States Patent Office 2,724,449
Patented Nov. 22, 1955

2,724,449
TANDEM AXLE SET WITH RETRACTABLE DRIVEN REAR AXLE

John H. MacPhee, James River Station, Antigonish County, Nova Scotia, Canada

Application May 1, 1952, Serial No. 285,522

1 Claim. (Cl. 180—22)

This invention relates to a powered retractable trailer drive for vehicles and more particularly for trucks.

The chief object of the invention is to increase the tractive effort of a vehicle by providing the vehicle with a retractable trailer truck powered from the main drive wheels of the vehicle.

A further object of the invention is to eliminate the sway of heavy vehicles by providing the vehicle with a retractable trailer truck, which may be powered, thereby effectively stabilizing the vehicle.

Yet another object of the invention is to increase the riding comfort of heavy vehicles by providing the vehicle with a retractable trailer truck thereby effectively increasing the wheel base of the vehicle.

A still further object of the invention is to increase the load carrying capabilities of a vehicle by providing the vehicle with a retractable trailer truck thereby eliminating the necessity of towing a separate wheeled conveyance.

One more object of the invention is to adapt a vehicle for travel over rough terrain by providing the vehicle with a retractable trailer truck powered from the main drive wheels of the vehicle.

With these and other objects in view which may appear while the description proceeds the invention consists in the novel arrangement of cooperating parts shown in the accompanying drawings forming part of this application and in which:

Figure 2 is an elevation partly in section of the embodiment showing the trailer drive in the retracted position;

Figure 3 is an end view partly in section of one portion of the embodiment;

Figure 4 is a section taken on the line 4—4 of Fig. 2; and

Figure 5 is a section taken on the line 5—5 of Fig. 1.

Figure 1:
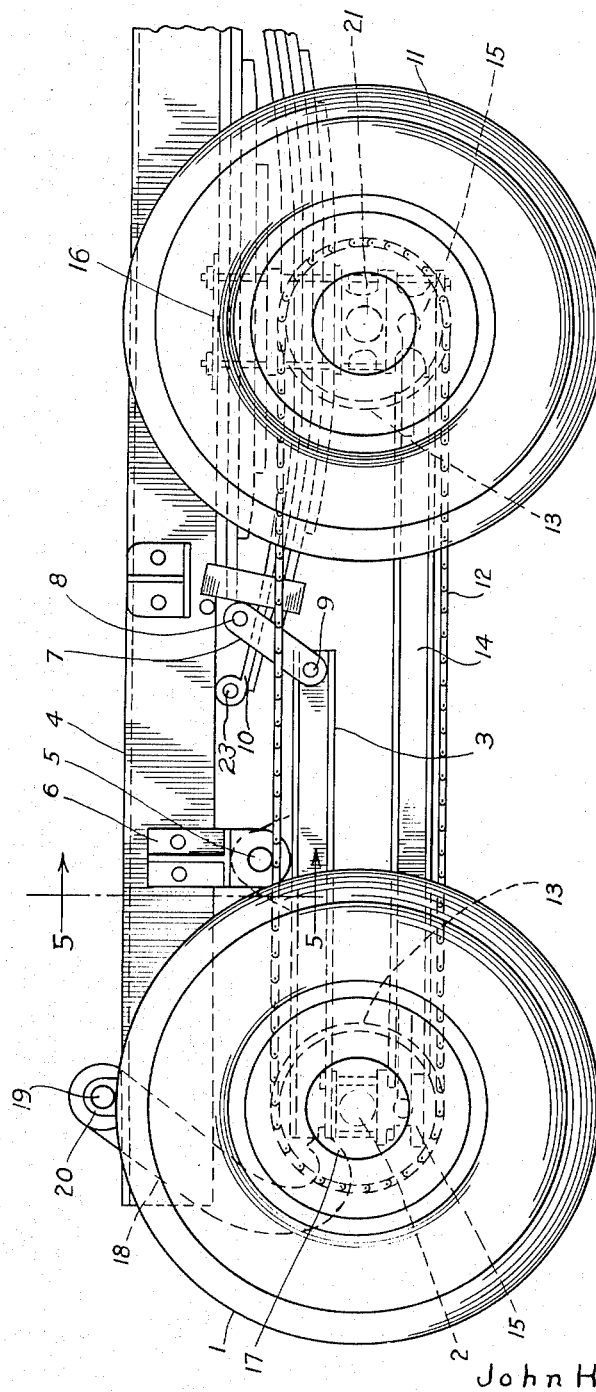
Figure 1 is an elevation of one embodiment of the invention showing the trailer drive in the operating position.

Referring more in detail to the drawings in which similar reference characters designate corresponding parts throughout the several views it will be seen that the invention consists of a plurality of wheels 1, revolvable about a retractable axle 2 suspended at one end of a plurality of walking beams 3 pivoted about the frame 4 of a vehicle. The wheels 1 are arranged in pairs in opposite sides of the vehicle to the rear of the main drive wheels. The walking beams 3 are arranged singly on opposite sides of the vehicle below the frame 4 and are suspended by means of a journalled shaft 5 and a plurality of fixtures 6 disposed singly on opposite sides of the vehicle.

A plurality of shackles 7 having a roller 8 at one end thereof are attached to the beams 3 by means of pivots 9 and are adapted freely to embrace and roll on longitudinal members 10 elastically affixed, as at 23, to opposite side of the frame 4. The longitudinal members 10 may be parts of the frame 4 but, in the form shown, are suspension springs for the main drive wheels.

Power for the wheels 1 is obtained from the main drive wheels 11 through a plurality of roller chains 12 and a plurality of sprockets 13 rigidly secured to the wheels 1 and 11.

Correct spacing of the trailing wheels 1 is maintained by a plurality of radius rods 14 disposed singly on opposite sides of the frame 4. The radius rods 14 are adapted at the extremities thereof to universally engage socketed fixtures 15, as at 22, which may be portions of the hangers 16 for the main drive axle 21 and the hangers 17 for the trailer axle 2.

A plurality of suitable hook members 18 secured to a shaft 19 provide a means of retaining the wheels 1 and axle 2 in the retracted position. The shaft 19 is carried in pillow blocks 20 rigidly secured to the frame 4. The wheels 1 and axle 2 may be raised to a position to permit the hook members 18 to engage beneath the axle by driving the trailing wheels 1 up an inclined ramp or by elevating the axle 2 by hydraulic jacks or the like.

In operation, the trailing wheels 1 receive their power from the drive wheels 11 through the roller chains 12 which are trained around the sprockets 13 carried by the wheels. As the trailing wheels are mounted for movement independent of the drive wheels they remain at all times in contact with the ground regardless of the contour of the ground and provide additional traction for the vehicle. When additional traction is not needed or desired the trailing wheels are free to be raised upwardly and are held in a raised position by engaging the hook members 18 with the axle 2 of the trailing wheels so that the drive wheels 11 are the only wheels in contact with the ground.

It is believed that the construction and advantages of the structure shown my be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:

A multiple wheel drive for vehicles comprising a pair of main drive wheels, a main drive axle supporting said wheels, springs suspending said axle from the frame of the vehicle, longitudinal beams pivotally suspended intermediate their ends from the frame of the vehicle rearwardly of the main drive wheels, an auxiliary axle carried by the rear ends of said beams, trailing drive wheels mounted on the ends of said auxiliary axle, shackles pivotally connected to the forward ends of said beams, rollers carried by said shackles in rolling contact with the upper surface of said springs and movable longitudinally thereof, radius rods extending between the main and auxiliary axles, universal joints at the ends of said radius rods for connecting the ends to said axles, a plurality of hangers pivotally suspended from the frame of the vehicle having hooked ends for engaging beneath said axle when said trailing wheels are raised upwardly whereby the trailing wheels are supported out of contact with the ground and means for transmitting power from said main drive wheels to said trailing wheels.

References Cited in the file of this patent

UNITED STATES PATENTS

| 1,620,809 | Foyer | Mar. 15, 1927 |
| 1,832,188 | Curtis | Nov. 17, 1931 |
| 1,891,642 | Harrison | Dec. 20, 1932 |
| 1,981,593 | Fageol | Nov. 20, 1934 |
| 2,139,937 | Collender | Dec. 13, 1938 |
| 2,247,009 | Averill | June 24, 1941 |
| 2,361,323 | Seghers | Oct. 24, 1944 |
| 2,391,948 | Couse | Jan. 1, 1946 |
| 2,471,992 | Wicker | May 31, 1949 |

FOREIGN PATENTS

| 417,687 | Great Britain | Oct. 10, 1934 |
| 474,059 | Germany | Mar. 27, 1929 |